United States Patent [19]
Ehrman

[11] Patent Number: 5,984,786
[45] Date of Patent: Nov. 16, 1999

[54] RUN-TIME ENVIRONMENT FOR SIMULATIONS AND GAMES

[75] Inventor: Eric Ehrman, Beit Shemesh, Israel

[73] Assignee: 2 AM Inc., Hackensack, N.J.

[21] Appl. No.: 08/779,858

[22] Filed: Jan. 3, 1997

[51] Int. Cl.$^6$ ........................................ A63F 9/22
[52] U.S. Cl. ............................... 463/42; 463/43
[58] Field of Search .................... 436/40, 41, 42, 436/43, 36

[56] References Cited

U.S. PATENT DOCUMENTS

| | | | |
|---|---|---|---|
| 5,350,176 | 9/1994 | Hochstein et al. | 463/42 |
| 5,558,339 | 9/1996 | Perlman | 463/42 |
| 5,636,209 | 6/1997 | Perlman | 463/42 |
| 5,791,993 | 8/1998 | Nakanishi | 463/42 |
| 5,793,382 | 8/1998 | Yerazunis et al. | 345/474 |
| 5,795,228 | 8/1998 | Trumbull et al. | 463/42 |
| 5,816,920 | 10/1998 | Hanai | 463/42 |
| 5,820,463 | 10/1998 | O'Callaghan | 463/42 |

OTHER PUBLICATIONS

*Computer World Gaming*, vol. 145:16, "Just the FAQS", Aug. 1996.

Alan Wexeblat, *Interactions*, "Letters & Updates", pp. 5–8, Jan. 1996.

Daniel Klein, *Interactions*, "Developing Applications with the Alpha UIMS", pp. 48–65, Oct. 1995.

*Primary Examiner*—Jessica J. Harrison
*Attorney, Agent, or Firm*—Darby & Darby

[57] ABSTRACT

A run-time environment for use with multiple multi-player, networked games and simulations includes a game model which defines the specifics of a game and a game engine which runs the game defined in the game model. The game model includes a database which stores the objects and their properties (properties include communicable properties) as well as the rules of the specific game which are to be executed on the objects and their properties. The game engine includes a rule evaluator, a database engine, a triggering mechanism and a communication unit. The rule evaluator evaluates the rules thereby changing the properties. The database engine updates the database whenever a property is changed. The triggering mechanism activates the rule evaluator whenever database engine changes a property. The communication unit is activated by the triggering mechanism whenever a communicable property changes and transmits the changed communicable property to another simulation unit. The communication unit also provides received communicable properties to the database engine.

20 Claims, 7 Drawing Sheets

Microfiche Appendix Included
(9 Microfiche, 520 Pages)

CLASS: INDEX

{FIXED CODE 0}—58
OnUpdate
    {FIXED CODE 1}—60
OnPreUpdate
    {FIXED CODE 2}—62

—54

SUBCLASS: RULE INDEX

OnUpdate
    EVALUATE CODE A
OnPreUpdate
    EVALUATE CODE B
OnRefUpdate
    EVALUATE CODE C

—56

RUN-TIME ENVIRONMENT FOR SIMULATIONS AND GAMES

This application contains a microfiche appendix, labeled Appendix A, of 9 pages of microfiche and including a total of 520 frames.

FIELD OF THE INVENTION

The present invention relates to run-time environments for multi-player computer games generally and to such environments for games played over a data network, in particular.

BACKGROUND OF THE INVENTION

Games have been played by the human race for a very long time. There are simple, one person games where the individual matches his wits against a deck of cards or a computer and there are multi-player games where a number of people gather together to match wits against each other.

Typical computer games include chess, where the computer acts as the opposing player, solitaire, where player plays against himself and the computer ensures that the player follows the rules, and action games, such as DOOM™, manufactured by GT Interactive of New York City, N.Y., USA, where the player has to move through a two- or three-dimensional world, fighting various objects and people to achieve maximal points. The computer presents the landscape of the world, moves the various objects and people and maintains the score of the player. Other types of computer games are simulation games, such as SIMCITY 2000™, manufactured by Maxis Inc. of Walnut Creek, Calif., USA, which enable the player to create a world and then simulate how that world will function.

With data networks which connect multiple workstations together, such as local area networks (LANs), wide area networks (WANs) and the Internet, have come multi-player games, such as AIR WARRJOR™, manufactured by Kesmai Corporation of the USA, and MULTIPLAYER BATTLETECH™, manufactured by FASA Inc. of the USA. With networked multi-player games, players can play together even though they are not physically close.

Unfortunately, creating such multi-player games for networks is difficult and time-consuming. In addition to programming the game concept, the programming team must program the constantly changing graphics, the responses to the player input and the communication with the other players. The latter is extremely difficult over wide area networks due to the latency inherent in transmitting data packets. Thus, the action on the screen of one player might not match the action on the screen of another player. This is undesirable. It is noted that programming a multi-player networked game typically takes many man-years.

SUMMARY OF THE PRESENT INVENTION

The present invention is a run-time environment for multi-player, networked games and simulations which can be used to run many different types of games and simulations. The term "game" will be utilized hereinbelow to refer both to games and simulations.

In accordance with a preferred embodiment of the present invention, the run-time environment includes a game model which defines the specifics of a game and a game engine which runs the game defined in the game model. The game model includes a database which stores the objects and their properties (some of the properties might be communicable among the players) as well as the rules of the specific game, where the rules are to be executed on the objects and their properties. The game engine includes a rule evaluator, a database engine, a triggering mechanism and a communication unit. The rule evaluator evaluates the rules thereby changing the properties. The database engine updates the database whenever a property is changed. The triggering mechanism activates the rule evaluator whenever database engine changes a property. The communication unit is activated by the triggering mechanism whenever a communicable property changes and transmits the changed communicable property to another simulation unit. The communication unit also delivers received communicable properties to the database engine.

Additionally, in accordance with a preferred embodiment of the present invention, the objects, properties and rules define a game or a simulation. The game can be any type of game, particularly a real-time interactive game. Some examples of games include a board-type game, a card game, a war game, a sport game, a strategy game, a puzzle game and an adventure game.

Moreover, in accordance with a preferred embodiment of the present invention, the system includes a user communication unit which provides messages to a user and enables the user to generate messages to other users. This produces social interaction among the users and also enables the game or simulation to provide information to the user, such as noting that one user is in the Checkmate state in Chess.

Further, in accordance with a preferred embodiment of the present invention, users of the simulation or game are defined as objects within the simulation or game. For this, at least one of the associated properties of the users represent the states of the input devices controlled by the users. The states of the input devices are communicable properties and can also be displayable. Other properties of the objects of the game or simulation can also be displayable.

Still further, in accordance with a preferred embodiment of the present invention, one of the simulation or game units can be a host unit and the remaining ones are client units operated by users of the simulation or game. The database of the host unit stores a first portion of the rules, objects and properties of the simulation or game and the databases of the client units store a second portion of the rules, objects and properties of the simulation or game. The split between first and second portions is up to the game designer.

Moreover, in accordance with a preferred embodiment of the present invention, the system includes an engine action executor, activated by the triggering mechanism, which executes the code of at least one non-simulation or non-game specific action to be performed.

Finally, in accordance with a preferred embodiment of the present invention, the communications network is one of the following: the Internet, a cable network, a local area network (LAN), a wide area network (WAN), and a telecommunications network.

BRIEF DESCRIPTION OF THE DRAWINGS AND APPENDIX

The present invention will be understood and appreciated more fully from the following detailed description taken in conjunction with the drawings in which.

DETAILED DESCRIPTION OF PREFERRED EMBODIMENTS

The present invention is a run-time environment for use with multiple multi-player, networked games and simulations. Before discussing the elements of the run-time environment, we will discuss the novel model of a game or a simulation which underlies the present invention. As mentioned hereinabove, the term "game" will be utilized hereinbelow to refer to both games and simulations.

The Game Model

Figure 1:
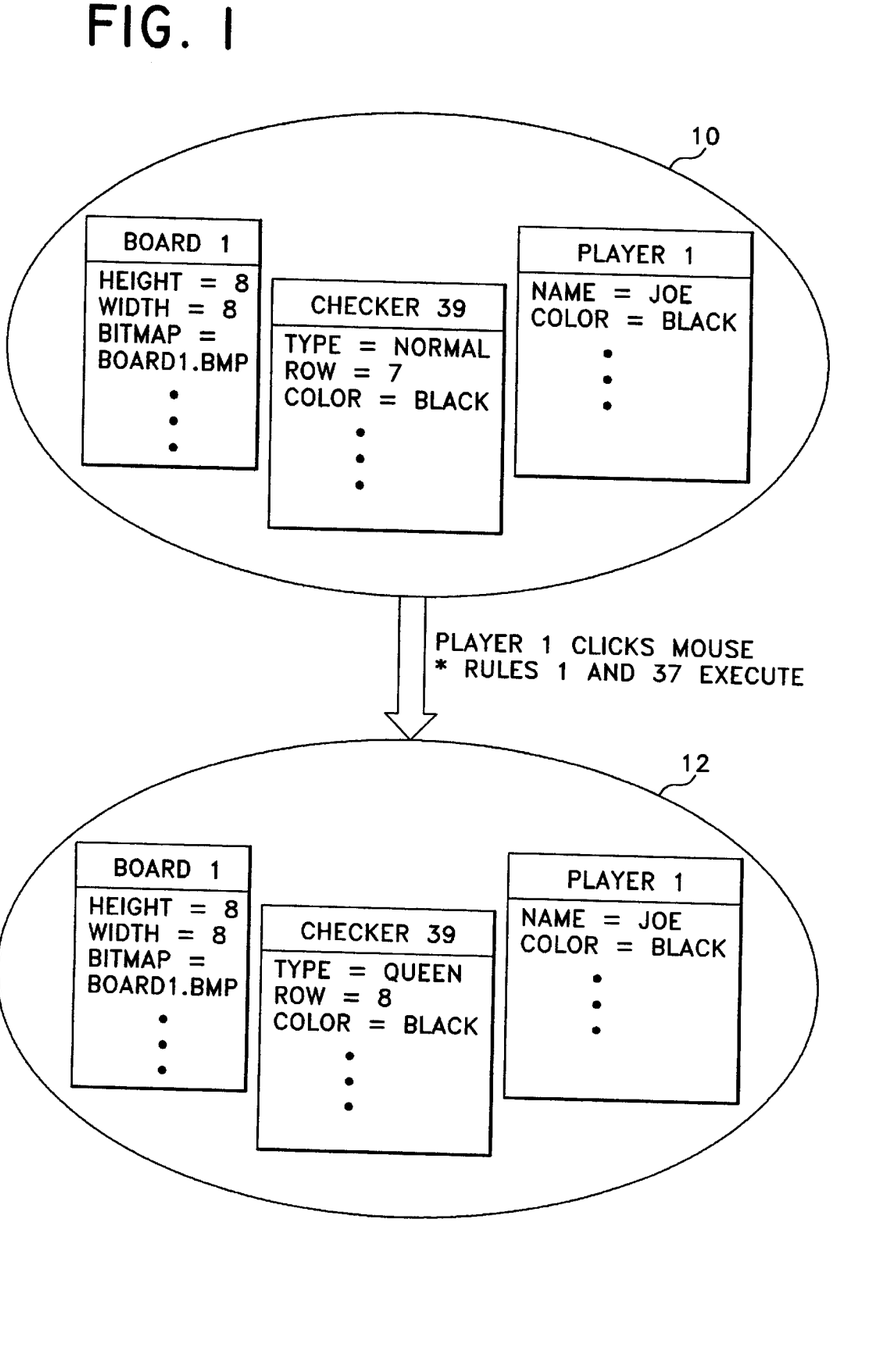
FIG. 1 is a schematic illustration of a game model and its changing properties over time, constructed and operative in accordance with a preferred embodiment of the present invention.

In accordance with a preferred embodiment of the present invention, each game is modeled as a set of objects, each of which has properties, and a set of rules which operate on the objects and on their properties. For example, take the game of Checkers, a part of which is illustrated in FIG. 1 to which reference is now made. At one stage, Joe, one of the players, has one of his pieces, numbered 39, in the 7th row, almost at the upper edge. At the next turn, Joe will move piece 39 to the 8th row, at which point, the piece will be a "queen" piece.

The present invention models the Checkers game as a series of objects and a set of rules. The objects include the pieces, the board and the players. FIG. 1 shows three objects, a checker piece, labeled "checker 39", a player, labeled "player 1" and a board, labeled "board 1", in two states 10 and 12.

Each object has a set of associated properties, each defining some aspect of the object. For example, player 1 might have a name (Joe) and a color of its pieces (black). The pieces each have a few properties, such as the row and column of the board at which they currently reside (row=7, for state 10 of this example), their color (piece 39 is black since it belongs to Joe) and its type (piece 39 is a "normal" piece at this stage). The board has properties defining its size and shape (it is an 8×8 square board) and the name of the bitmap which holds its image (board 1.bmp).

The objects typically have many more properties than are shown in FIG. 1; for example, the checker pieces might have bitmaps associated with them, showing the shape and texture of the piece. In addition, the pieces can have animation properties (the pieces might move from square to square in an animated way), music properties (certain music might be associated with certain pieces or certain actions) or other properties (such as strength of the player) associated therewith. Furthermore, some of the properties may also have "meta-properties", such as whether or not the property is "distributed", meaning that all of the participating computers are modified whenever the property is changed by one player. Thus, if Joe moves piece 39 during his turn, the movement of piece 39 is displayed on the monitors of the players.

It is noted that, in accordance with a preferred embodiment of the present invention, even the players are considered objects and their actions (as provided by keystrokes, mouse movements or mouse clicks) are modeled as changes in the properties of the objects. Thus, the run-time environment does not have to deal separately with player operations than with other types of changes in properties of objects.

During a turn, the players move their pieces, typically through mouse movement and clicking and/or by pressing the keyboard. This causes the rules of the game to be executed on the objects whose properties changed. One set of rules might ensure that the movement is a legal Checkers move. Another might check whether or not the piece should be "queened".

In FIG. 1, player 1 moved and clicked his mouse. This might cause rules 1 and 37, given in the boxes hereinbelow, to execute. Rule 1 determines the new location of the piece and rule 37 determines whether or not to queen a checker piece.

```
Rule 1 on Player.
  triggered_by_mouse.clicked
  if((mouse.row – piece.row – 1) and
    (abs(mouse.col – piece.col) = 1))
    piece.row = mouse.row
    piece.col = mouse.col
Rule 37 on piece, triggered_by_row
  if((row = 8) and (type = normal))
    type = queen
```

Accordingly, state 12, after Joe has moved piece 39 to row 8, shows that most of the properties of the objects have remained the same. The only changes produced by the rules is that piece 39 is now of the "queen" type and is in row 8.

Figure 2:
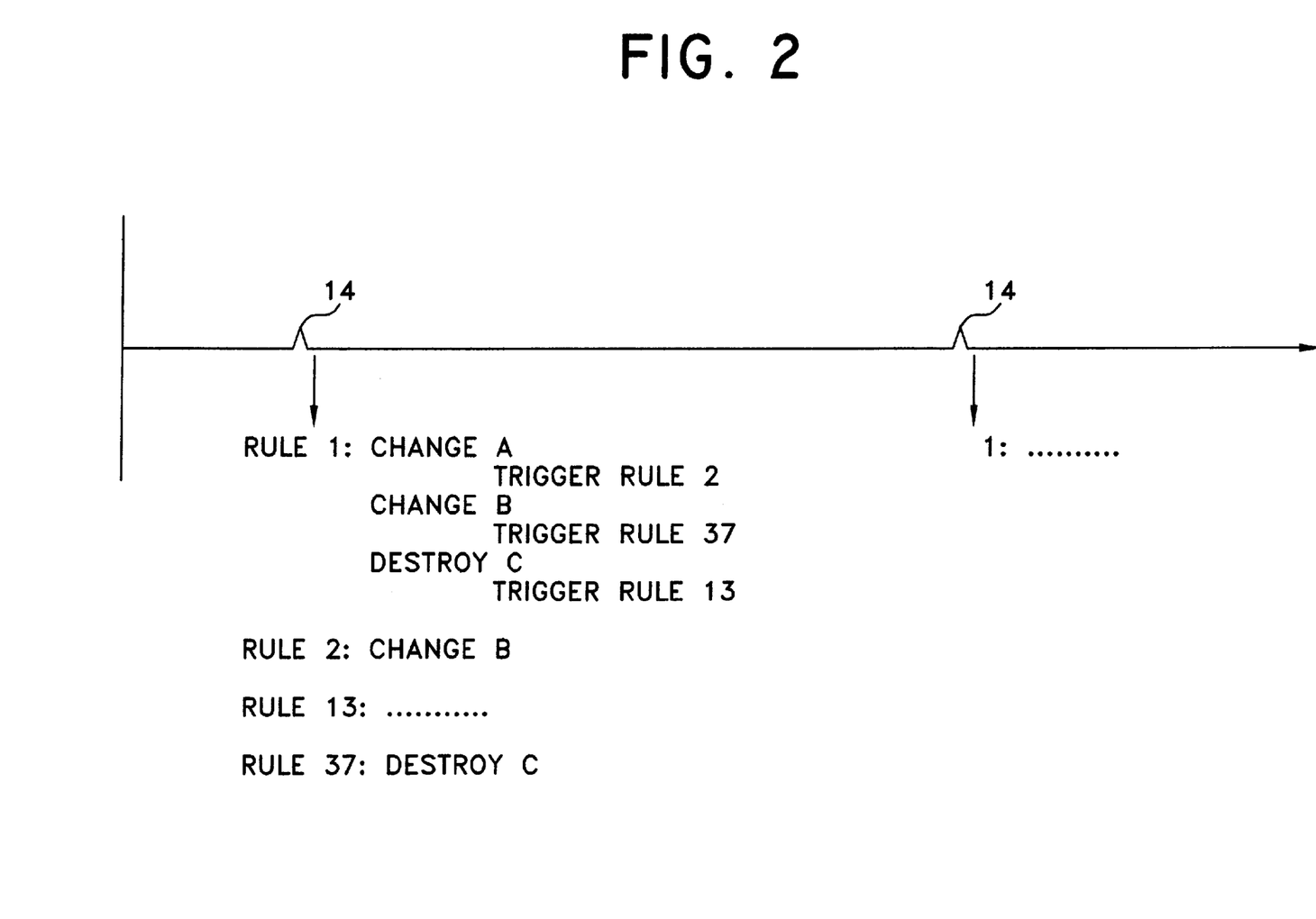
FIG. 2 is a timing diagram illustration of rule evaluation, useful in understanding the operation of the game model of FIG. 1.

In accordance with a preferred embodiment of the present invention, rules can be triggered by timing pulses or by changes in the properties of objects. The execution of a rule typically causes changes in the properties of objects and this, in turn, triggers execution of further rules. This is illustrated in FIG. 2 which shows two timing pulses 14 of a clock and the resultant operations. Whenever there is a clock pulse 14, rule 1 is executed which, as shown, causes the properties of objects A and B to change. The object C is indirectly destroyed by rule 1.

Each change in the properties (including the destruction of object C), can trigger the execution of another rule. Thus, the change in A triggers rule 2 which changes B, the change in B triggers rule 37 which destroys C and the destruction of object C triggers rule 13.

It will be appreciated that the game model of the present invention can be utilized to define many types of games and simulations. It is particularly suited to multi-player, real-time interactive games and simulations. It can implement board games, such as the Checkers game described hereinabove, where the players indicate where pieces on a board are to move. If desired, the pieces can have animation and can move to the indicated location. The game model of the present invention can also implement real-time strategy games, action games, card games, war games, sports game, puzzle games and adventure games. The term "real-time" indicates that the action is continual rather than being 'turn-based'.

Although not shown in the example of Checkers but described hereinbelow, the present invention includes a chat mechanism by which the players can "talk" to each other during play. Thus, the present invention can implement games where people work together towards some common goal, such as in strategy games.

The Run-time Environment

Figure 3A:
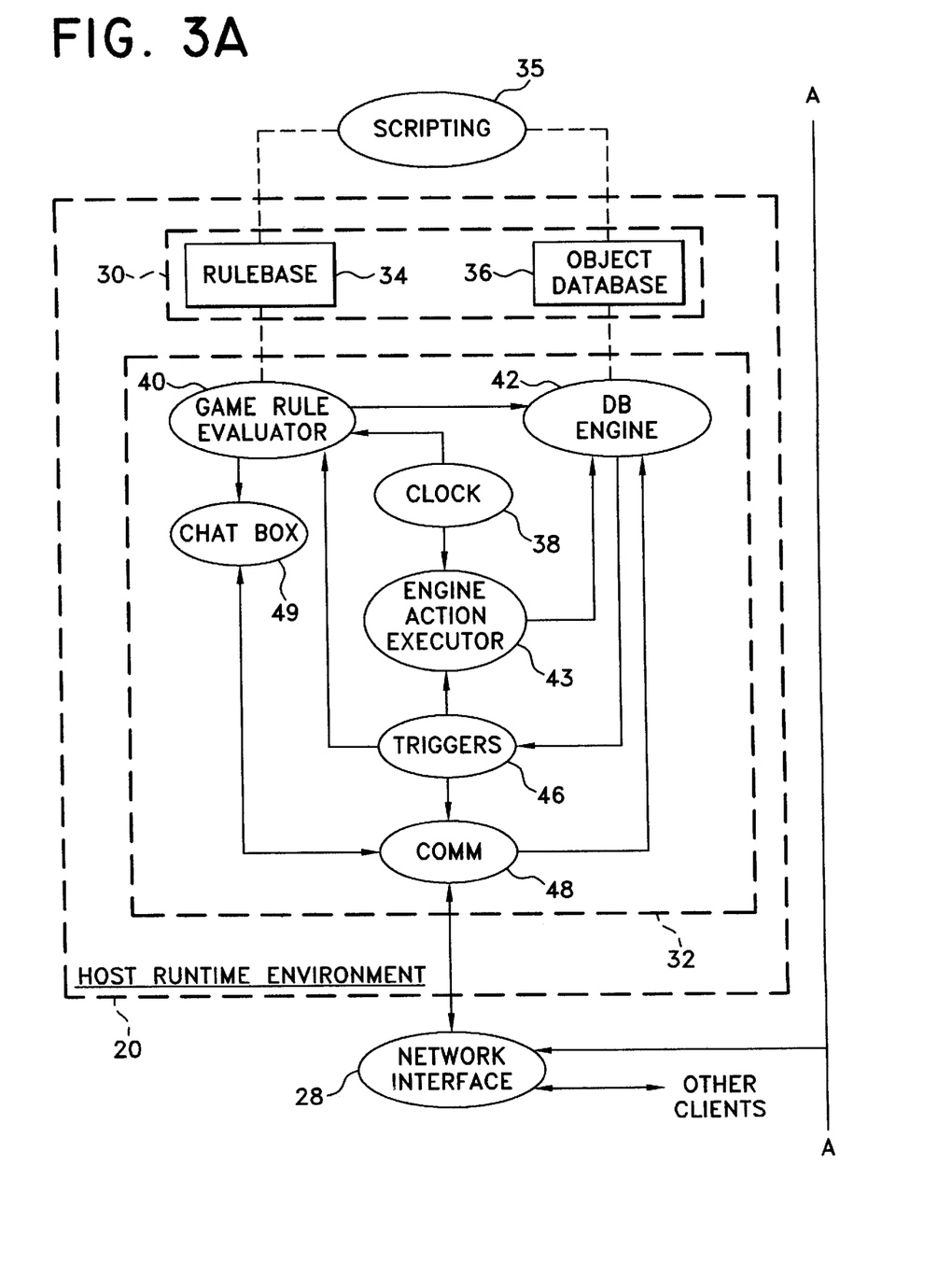
FIG. 3 is a block diagram illustration of a run-time environment, constructed and operative in accordance with a preferred embodiment of the present invention and implementing the game model of FIG. 1.
Figure 3B:
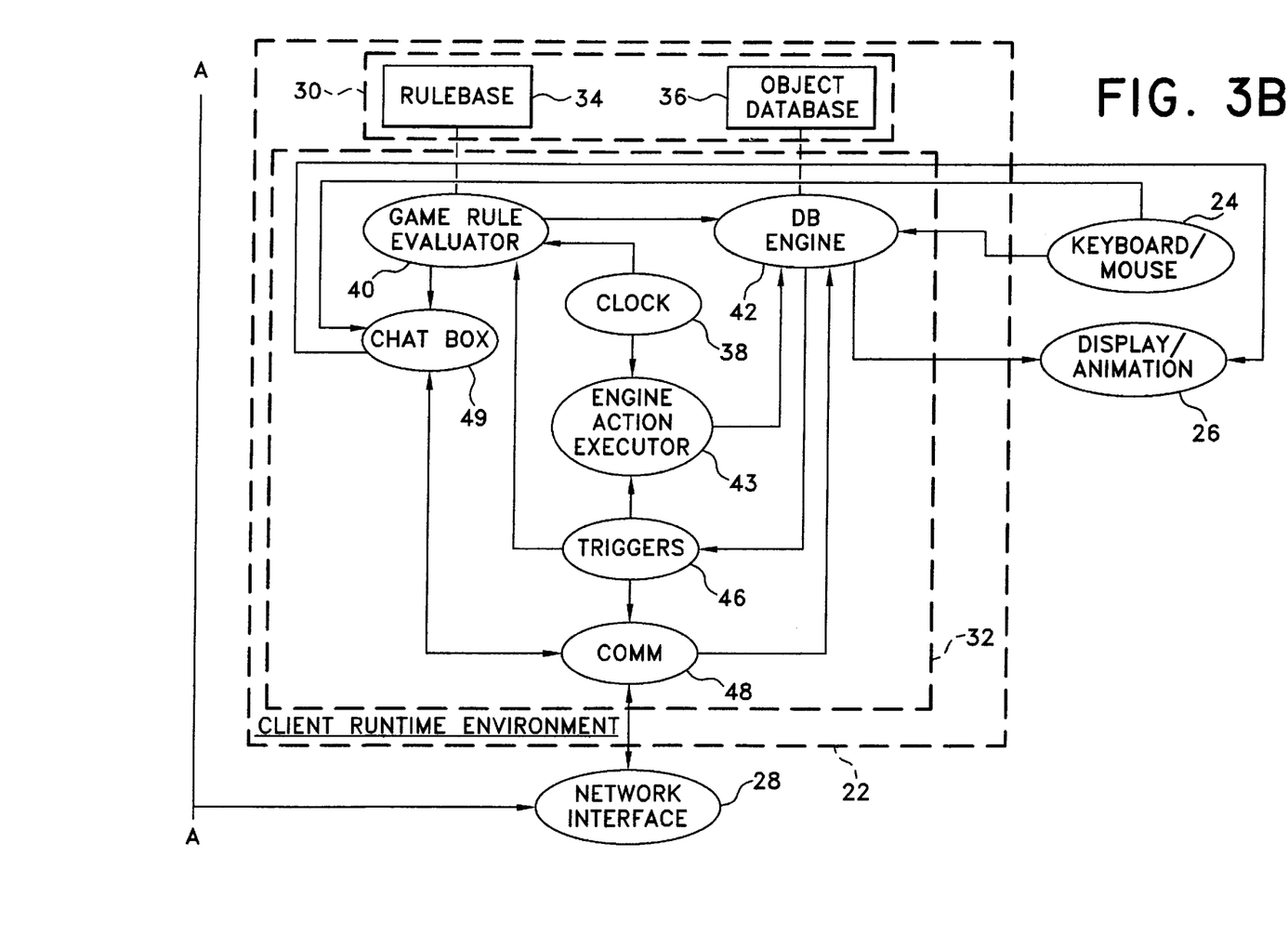

Reference is now made to FIG. 3 which illustrates the run-time environment of the present invention and its networked connection to player workstations. It will be appreciated that the run-time environment assumes the model of the present invention.

FIG. 3 shows that there are two types of run-time environments, a host run-time environment 20 and a client run-time environment 22. In any game playing system, there is a single host run-time environment 20 while there are one or more client run-time environments 22, to which the player input 24 (e.g. a keyboard and/or a mouse) and player output 26 (e.g. display) are attached. The run-time environments 20 and 22 are connected together through a network, such as the Internet, a cable network or a simple local area network (LAN). The output of the communication unit of each run-time environment is provided to a network interface 28 of the appropriate type.

The run-time environments are similar and all include a game model 30, which defines the specifics of a game, and a game engine 32 which runs the game defined in the game model 30. The game model 30 comprises an object database 36 which stores the objects and their properties and a rulebase 34 which stores the rules of the specific game which are to be executed on the objects and their properties. Although FIG. 3 illustrates database 36 and rulebase 34 as individual elements, they can be implemented in single database, if desired.

A game designer usually designs the game concept from which the objects, their properties and the rules are defined. As shown in FIG. 3, the game model can be registered with a scripting tool 35 which places the objects and their properties into the object database 36 and the rules into the rulebase 34. The scripting tool 35 can be any suitable tool with which game information is listed in the rulebase 34 and object database 36. For example, the scripting tool 35 can be a graphical guided interface.

It will be appreciated that, by dividing the game into the game model 30 and the game engine 32, all non-game specific details of a game (the display system, the input system, how to animate the player objects, how to move the game along, how to communicate among the players, etc.) are implemented in a single game engine 32 while the specifics of a game (how it is played, how it looks, etc.) are defined in the game model 30 for that game. Thus, a single game engine 32 can be bundled with many game models 30. In effect, the present invention provides a high level language for writing games (e.g. the game models 30), each of which is run by the game engine 32.

The game engine 32 comprises a clock 38, a rule evaluator 40, a database engine 42, an engine action executor 43, a trigger mechanism 46, a communication unit 48 and a player communication unit 49, otherwise known as a "chat box". Rule evaluator 40 and engine action executor 43 both execute code which moves the game along and changes properties of objects. However, rule evaluator 40 evaluates game specific rules stored in rulebase 34 and engine action executor 43 executes predefined, non-game specific actions, such as the display mechanism, the input from the player, etc.

The clock 38 activates either or both of rule evaluator 40 and engine action executor 43 both of which, in turn, activate database engine 42. Database engine 42 then activates trigger mechanism 46 which, in turn, activates one or both of rule evaluator 40 and engine action executor 43. Furthermore, trigger mechanism 46 can also activate communication unit 48. When so indicated by a player, rule evaluator 40 or engine action executor 43 activates chat box 49 into which the player types a message. When the player indicates that the message is finished, chat box 49 activates communication unit 48 to transmit the message to its intended recipients.

The clock 38 triggers the evaluation of those actions (e.g. game specific rules and/or non-game specific actions) which are to be evaluated periodically, such as rule 1 of FIG. 2, a change-display action, etc. Typically, the clock 38 of the host run-time environment 20 sets the timing of the game (i.e., the frequency at which such actions are evaluated).

The rule evaluator 40 and engine action executor 43 cause changes to the properties of the objects. The rule evaluator 40 does so by interpreting and executing the rules of the rulebase 34 relating to the specifics of the game. The engine action executor 43 does so by performing predefined actions which are common to many games.

The database engine 42 maintains the database 36 of all the game objects and their properties, changing any properties and creating any objects as indicated to it by the rule evaluator 40 and the engine action executor 43. The database engine 42 also activates the trigger mechanism 46 in response to changes to the objects and their properties.

The trigger mechanism 46 triggers rules when properties of objects change. In addition, the trigger mechanism 46 provides data to the communication module 48. The data being transmitted is the entirety of the distributed object properties which were just changed by the host 20 or a client 22. The received data is provided to the database engine 42 (of the host or client) which places the data into the object database 36. As a result of the changed data, the database engine 42 of the recipient run-time environment 20 or 22 activates its trigger mechanism 46 to respond to the newly changed data. Thus, the received data causes its associated rules to be performed on the recipient run-time environment 20 or 22.

The communication module 48 and the network interface 28 of each run-time environment 20 and 22 supply a packet and stream connection between the machines participating in a game. The communication mechanism can be the standard Internet TCP/IP protocols, those of proprietary cable networks or of telecommunications networks or any other network protocol(s).

On the host machine, the communication module 48 typically receives all distributed properties which must be sent to one or more of the client runtime environments 22 and organizes them into data to be sent. Module 48 provides the data and the address of the client which is to receive the data to network interface 28 which, in turn, provides the data in accordance with standard network protocols. On the client machines, which only communicate with the host machine, the communication modules 48 provide the data and the address of the host to network interface 28. Thus, if two players are connected to the host machine via two different networks (for example, the first player might be connected via an internal office network and the second player might be connected via the Internet), the two players can still play with each other since their client run-time environments 22 only communicate with the host run-time environment 20.

The input/output unit 24 is associated with the client run-time environments 22 and is operative to receive keystrokes or mouse movements and provide them to the client database engine 42 which updates the database 36 accordingly. As a result of the database update, a property change trigger occurs which typically activates the display/animation unit 26, described hereinbelow, to display the object at its new location and perform any associated animation. Furthermore, since the properties associated with keystrokes and mouse movements are defined as distributed properties, the trigger mechanism 46 of the client runtime environment 22 transmits the updated properties via its communications unit 48 and network interface to the host runtime environment 20. On the host side, the communications unit 48 provides all of the distributed properties to the database engine 42 which updates the object database 36 accordingly. The update operation then activates the host trigger mechanism 46 to activate the associated rules and actions.

The display/animation unit 26 is also associated with the client run-time environments 22. Unit 26 handles all issues related to bitmap display, color palette management, z-ordering, animation sequencing, and smooth redisplay. The latter is typically performed using off-screen buffering. The display/animation unit 26 operates on only those objects whose distributed properties have changed either locally, due to local keystrokes, or whose property changes have been received from the host run-time environment 20.

The rules of the game can be executed on either the host run-time environment 20 or the client run-time environment 22 or a combination of the two. Wherever a rule is executed, its associated objects and properties are also to be found. Thus, if a rule is executed only on the host, the associated objects and properties will be found only in the host database. The same holds true for internal, non-game actions.

The game designer selects which rules will be executed on which type of machine where, minimally, the client run-time environment 22 executes only those rules and actions associated with input and output (e.g. keystrokes, mouse movements and display changes) and the host run-time environment 20 executes all the other rules and actions. Alternatively, the client run-time environment 22 can execute the entirety of rules and actions of the game while the host run-time environment 20 only executes those rules and actions involving transmitting data from one client machine to the next.

The former mode ensures that the game data is centralized which makes the game easier to write and more maintainable while the latter ensures that the host run-time environment 20 can handle communication among many players (known as "load sharing"). The balance between the two modes of operation is selectable and typically depends on the type of game. Separating the rules and actions of a game between the host and the client also helps solve latency problems associated with wide area networks. By locally performing actions and rules associated with responding to the user's actions, the user will hardly notice the time it takes for the server to respond to his actions.

Chat box 49 provides players with a mechanism to "talk" to each other before, during and after a game. Chat box 49 can take the form of a message box in which players type messages to each other, a voice unit having a microphone and a speaker with which players speak to each other and/or a video unit so that players can see each other. Thus, chat box 49 enables the present invention to implement games which require social interaction, such as strategic games or games where groups of people play a single game entity. With chat box 49, players can make deals, break them, persuade other players to do something, etc. Furthermore, social games like Bridge, Chess, etc. where people discuss the action, can also be implemented.

Still further, chat box 49 can be activated by the run-time environment whenever there is a message to a player from the game, such as the message "Checkmate" in Chess.

In one embodiment, chat box 49 utilizes a message box, similar to those found in Internet Relay Chat (IRC) systems, into which players type messages and indicate their recipient(s). The message box is also activated whenever a player receives a message from another player or from the game. If a message is to be sent from a first player to a second player, the client run-time environment 22 of the first player sends the message to the host machine which then forwards the message to the client run-time environment 22 associated with the second player. Alternatively, if chat box 49 is a voice messaging system, the voice messages might be sent directly between client run-time environments 22, as long as there was a network connection between the two client run-time environments 22.

Figure 4A:
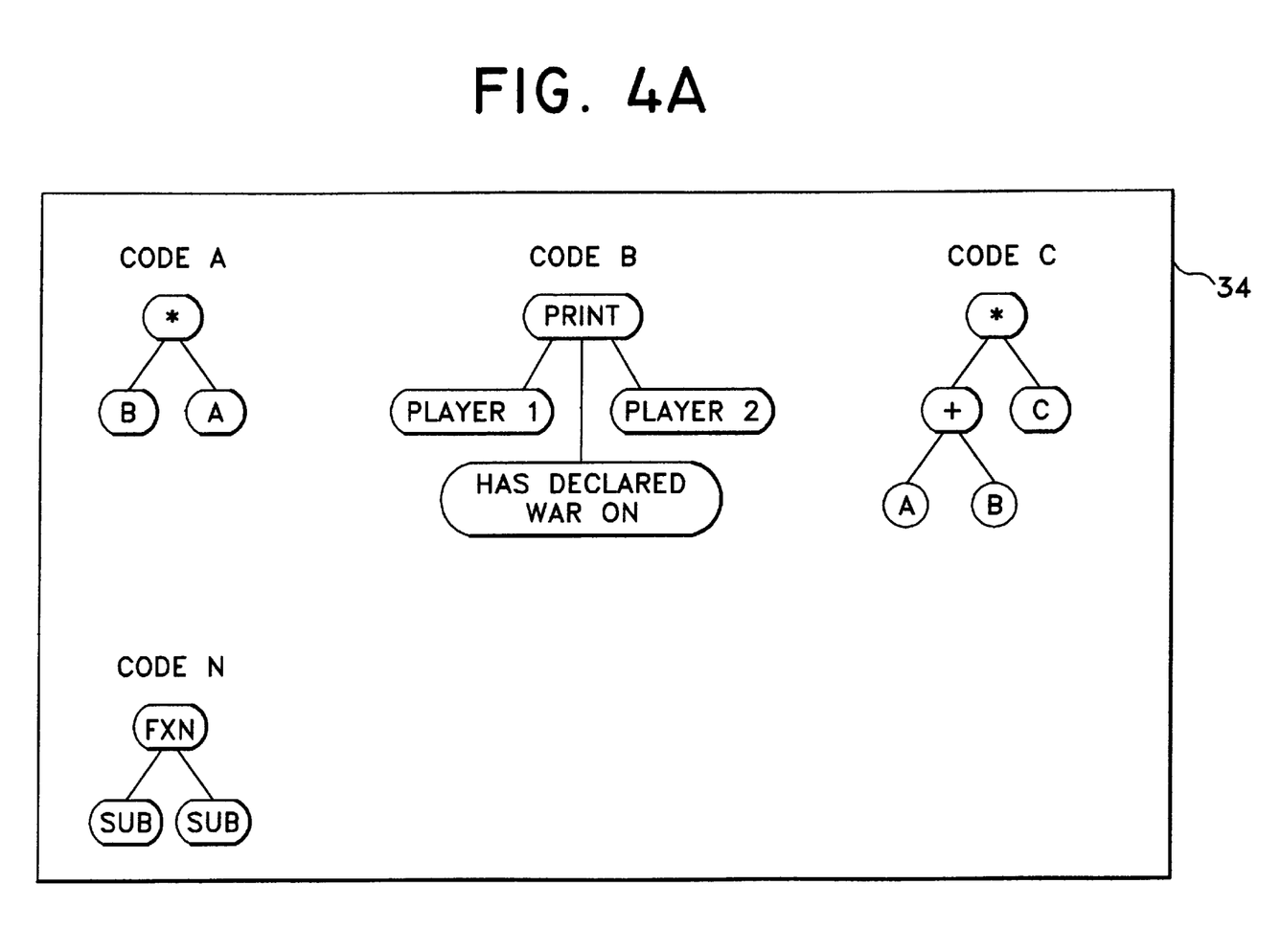
FIG. 4A is a schematic illustration of a rulebase, useful in understanding the operation of the run-time environment of FIG. 3.
Figure 4B:
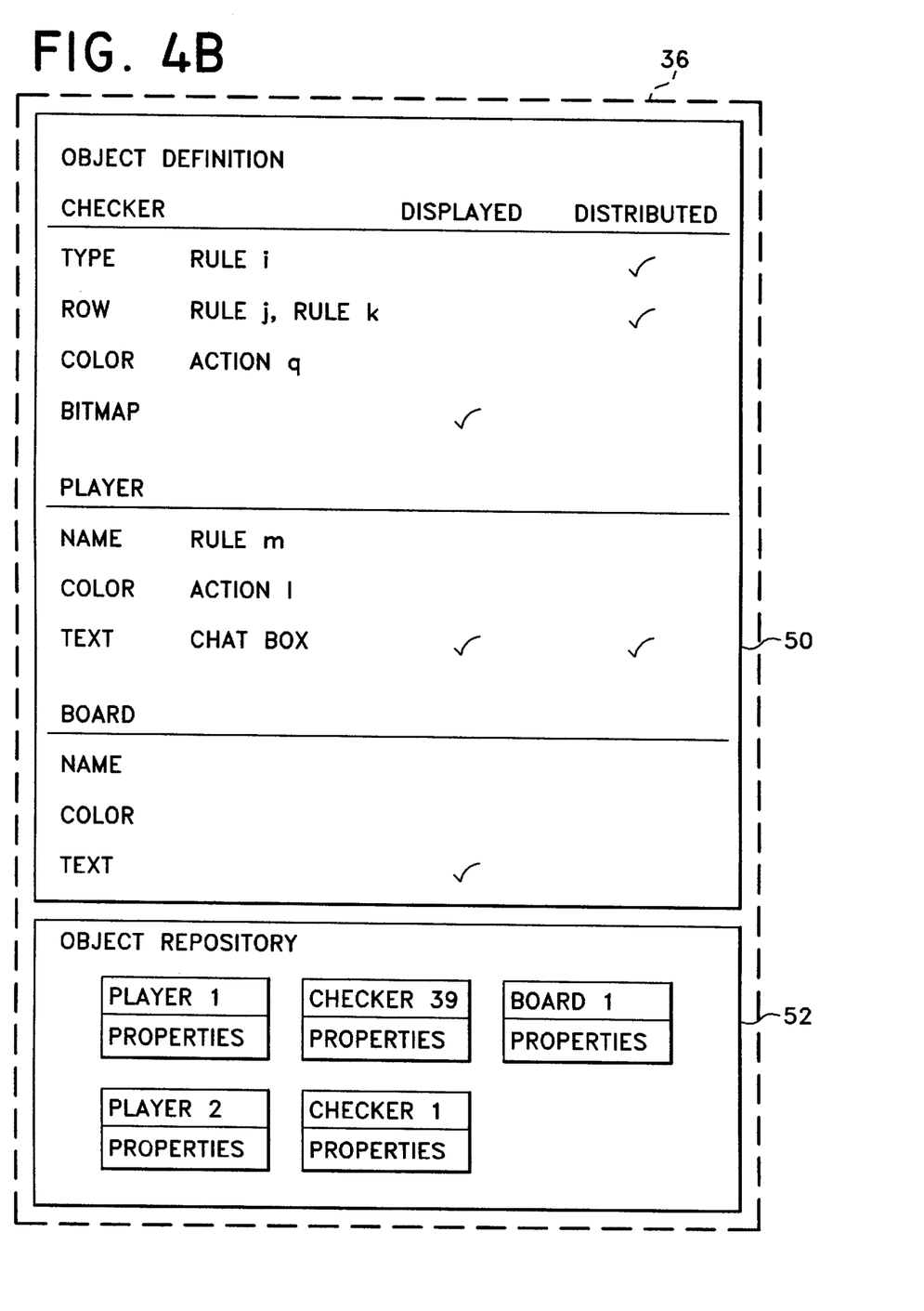
FIG. 4B is a schematic illustration of an object database, useful in understanding the operation of the run-time environment of FIG. 3.

Reference is now made to FIGS. 4A and 4B which respectively illustrate one embodiment of the rulebase 34 and object database 36 of the present invention.

Rulebase 34 stores the operations to be performed for each rule. Each operation is stored as a tree of variables and operators, as indicated in FIG. 4A, where the base is an operator and the branches are the variables or subexpressions on which the operator is to act. The code for three exemplary rules are shown in FIG. 4A. Code A, with the multiplication operator as the base and two variables A and B as branches, multiplies variables A and B. Code B, with a print statement as the base, two variable player names and the text "has declared war on" as branches, prints the statement "Player 1 has declared war on Player 2". The print statement of code B typically will cause chat box 49 to be activated, thereby printing the statement on the screen of one or more players. Code C has the multiplication operator at its base, one branch having the variable C and another branch having the addition operator. The branch from the addition operator has two branches with variables A and B. Code C performs the operation: $C*(A+B)$. Code N indicates this operation in general: the base "fxn" operates on the two "sub" subexpressions, where the subexpressions can be operations and/or variables.

Suitable operations are the standard mathematical functions, creation and deletion of an object or a property, a print function, the ability to add items to a list and the ability to stop the game.

It will be appreciated that, in the present embodiment, to implement a rule, the rule evaluator 40 reads the relevant code in rulebase 34 and performs the operation(s) described therein.

Object database 36 (FIG. 4B) comprises two sections, an object definition section 50 and an object repository 52. The object definition section 50 stores the definitions of all of the possible types of objects available for the present game while the object repository 52 lists all of the currently active objects and the current values of the properties. For example, for the Checkers game of FIG. 1, three types of objects are defined, the checker pieces, the players and the board. The object repository 52 shows two player objects, two checker piece objects and a single board object. Thus, at this stage of the game, the two players each have only one checker piece on the board.

The object definition section 50 lists the types of properties of each object, the rule or action, or both, to be triggered upon change of each property and whether or not the property has the meta-property of being distributed and/or of being displayed. For example, the row of a checker piece might be a distributed property which, when updated, triggers rules j and k. Similarly, updating the color of a checker piece might trigger action q. In another example, a player might have a text property which is distributed and displayable and which, upon update, triggers chat box 49. Furthermore, the bitmap of the checker piece might have the displayed property meaning that, when something about the checker piece changes, the bitmap of the piece must be redisplayed. Redisplaying can include also playing a musical sound associated with the piece.

It will be appreciated that, in this embodiment, database engine 42 performs regular database management, creating, updating and removing the objects in the object listing section 52 in accordance with the object definitions of section 50. In addition, whenever database engine 42 updates a property of one of the active objects of object repository 52, database engine 42 checks the associated object definition to determine which rule or action, or both, to trigger. Database engine 42 provides the object and an identifier of the action to trigger to the triggering mechanism 46 which, accordingly, activates the relevant rule evaluator 40 or engine action executor 43. Furthermore, database engine 42 indicates to triggering mechanism 46 whether the property which changed is distributed, in which case, triggering mechanism 46 provides the changed property to the communications unit 48.

Because a changed property can trigger more than one action, triggering mechanism 46 typically also comprises an action operation controller which orders the actions which have been triggered, ensuring that all occur in a predetermined order. Trigger mechanism 46 also includes a listing of the beginning location of each rule within rulebase 34 which trigger mechanism 46 provides to rule evaluator 42.

Figure 5:
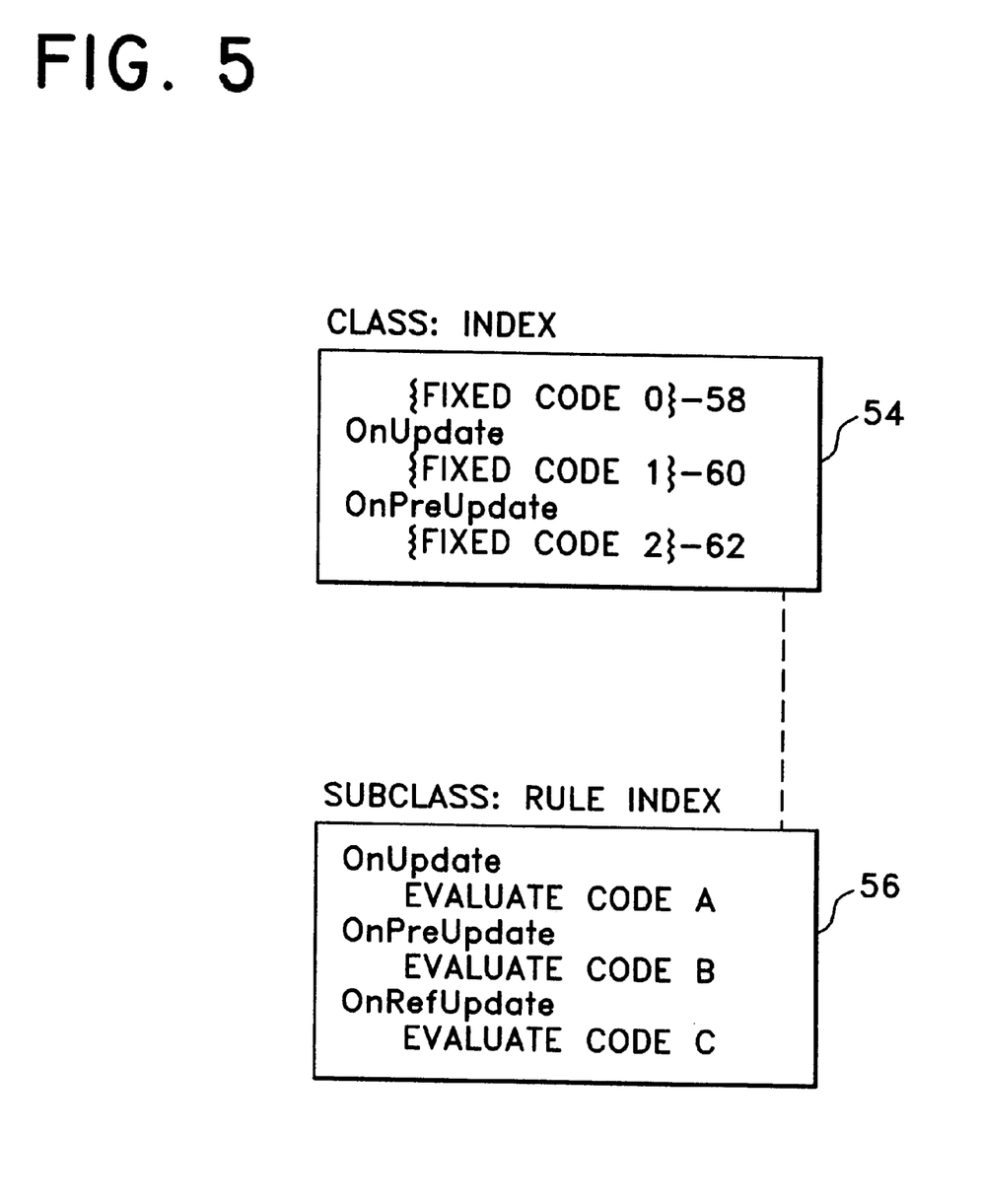
FIG. 5 is a schematic illustration of class code, useful in understanding one embodiment of the run-time environment of FIG. 3.

Reference is now made to FIG. 5 which illustrates an exemplary, object oriented embodiment of trigger mechanism 46, rule evaluator 40 and engine action executor 43. In this embodiment, there is a class called "index", labeled 54, which organizes groups of objects and/or properties according to different criteria and associates activity with the objects. For example, there might be one index associated with the player objects, another with the checker piece objects and a third with all displayable properties. In an action game, there might be an index associated with all ships regardless of type (fighting or otherwise). Furthermore, in this embodiment, the object definition section 50 of FIG. 4B lists the indices associated with each object and with each property of the object, rather than the specific rule or action as shown in FIG. 4B.

An index accesses its objects from the database 36 and then performs whatever action matches the current state of the objects. Each index contains code to be performed whenever the index is activated and/or code associated with certain states of the properties of the objects associated therewith. Thus, if only one of the properties of the object has changed, only the action associated with the changed property will be performed. Alternatively or in addition, an action might occur when the index is activated.

Each index 54 contains many different sets of code, of which four types, 58, 60, 62 and 64 are illustrated in FIG. 5. Engine action executor executes code 58 when the index is activated. Code 58 might access the associated objects and perform some standard operations on them. Codes 60 and 62 respectively occur on one of two triggering actions: OnUpdate and OnPreUpdate. Thus, engine action executor 42 executes the code 60 of OnUpdate after database engine 42 updates the property and executes code 62 of OnPreUpdate before database engine 42 updates the property. Codes 58, 60 and 62 are fixed codes (i.e. not stored in rulebase 34) and implement the actions executed by the engine action executor 43. Some of codes 60 and 62 do not affect the properties of objects while others do.

Since input and output actions are the same for all games, in accordance with a preferred embodiment of the present invention, the input unit 24 and output unit 26 are implemented as indices. Input unit 24 is activated by mouse movements or keystrokes and includes the player object and output unit 26 is activated by changes to displayable properties and includes all objects having displayable properties.

As illustrated in FIG. 5, there is a subclass called "rule index", labeled 56, which evaluates the associated rules when activated. Each rule of rulebase 34 is associated with one or more rule indices which evaluate the rule when activated. The subclass of rule indices also contain the same three triggering actions; however, the code therein is a call to rule evaluator 40 to evaluate the relevant rule stored in rulebase 34 based on the current state of the object or property. The example in FIG. 5 indicates that Code A of FIG. 4A is to be evaluated on update, code B of FIG. 4A is to be evaluated before update and Code C of FIG. 4A is to be evaluated on reference update.

Reference is now briefly made to Appendix A which is a uuencoded version of an exemplary run-time environment which operates under the WINDOWS 95™ operating system.

It will be appreciated by persons skilled in the art that the present invention is not limited to what has been particularly shown and described hereinabove.

I claim:

1. A system for running simulations over a communications network, the system comprising:

at least two simulation units connected together via said communication network, wherein each simulation unit comprises:

a database for storing a multiplicity of objects of a simulation and the values of their associated properties, wherein a portion of said properties are communicable properties, and for storing a second multiplicity of rules, wherein each rule defines how to change at least one of said values of at least one of said properties;

a rule evaluator for evaluating at least one of said rules and changing thereby at least one of said properties;

a database engine for updating said database whenever at least one of said properties is changed;

a triggering mechanism for activating at least said rule evaluator whenever said database engine changes at least one of said properties; and a communication unit, activated by said triggering mechanism whenever one of said communicable properties changes, for transmitting said at least one changed communicable property to another simulation unit and for providing received communicable properties to said database engine.

2. A system according to claim 1 and wherein said objects, properties and rules define a game.

3. A system according to claim 2 and wherein said game is a real-time, interactive game.

4. A system according to claim 3 and wherein said game is one of the following type of game: a board-type game, a card game, a war game, a sport game, a strategy game, a puzzle game, action game and an adventure game.

5. A system according to claim 1 and also comprising a user communication unit for providing messages to a user and for enabling a user to generate messages to at least one other user at one of said client units.

6. A system according to claim 5 and wherein one of said rules defines a message to be sent to at least one player communication unit.

7. A system according to claim 5 and wherein said objects, properties and rules define a social interaction game.

8. A system according to claim 1 and wherein a portion of said objects are representations of the users of the simulation and wherein at least one of said associated properties of said representations of said users are the states of the input devices controlled by said users.

9. A system according to claim 8 and wherein said states of input devices are communicable properties.

10. A system according to claim 1 and wherein a portion of said properties are displayable properties.

11. A system according to claim 1 and wherein one of said simulation units is a host unit and the remaining ones of said simulation units are client units operated by users of said simulation.

12. A system according to claim 11 wherein said database of said host unit stores a first portion of said rules, objects and properties of said simulation and said databases of said client units store a second portion of said rules, objects and properties of said simulation.

13. A system according to claim 2 and wherein one of said simulation units is a host unit and the remaining ones of said simulation units are client units operated by players of said game.

14. A system according to claim 13 wherein said database of said host unit stores a first portion of said rules, objects and properties of said game and said databases of said client units store a second portion of said rules, objects and properties of said game.

15. A system according to claim 1 and also comprising an engine action executor, activated by said triggering mechanism, for executing a non-simulation specific action to be performed.

16. A system according to claim 2 and also comprising an engine action executor, activated by said triggering mechanism, for executing a non-game specific action to be performed.

17. A system according to claim 1 and wherein said communications network is one of the following: the Internet, a cable network, a local area network (LAN), a wide area network (WAN), and a telecommunications network.

18. A simulator for running simulations over a communications network, the simulator comprising:

a database for storing a multiplicity of objects of a simulation and the values of their associated properties, wherein at least a portion of said properties are communicable properties, and for storing a second multiplicity of rules, wherein each rule defines how to change at least one of said values of at least one of said properties;

a rule evaluator for evaluating at least one of said rules and changing thereby at least one of said properties;

a database engine for updating said database whenever at least one of said properties is changed;

a triggering mechanism for activating at least said rule evaluator whenever said database engine changes at least one of said properties; and a communication unit, activated by said triggering mechanism whenever one of said communicable properties changes, for transmitting said at least one changed communicable property to another simulation unit and for providing received communicable properties to said database engine.

19. A simulator for running simulations over a communications network, the simulator comprising:

a database for storing a multiplicity of objects of a simulation and the values of their associated properties, wherein at least a portion of said properties are communicable properties, and for storing a second multiplicity of rules, wherein each rule defines how to change at least one of said values of at least one of said properties;

a plurality of indices, wherein each index organizes at least said objects according to at least one criterion, accesses the objects associated therewith when activated, and performs actions on said objects when appropriate based on the properties and types of objects associated with said index, wherein said plurality of indices comprises a second plurality of rule indices, wherein each of said rules belongs to at least one of said rule indices.

20. A simulator for running simulations over a communications network the simulator including a memory, the simulator comprising:

a database stored in said memory for storing a multiplicity of objects of a simulation and the values of their associated properties, wherein at least a portion of said properties are communicable properties, and for storing a second multiplicity of rules, wherein each rule defines how to change at least one of said values of at least one of said properties;

index class information stored in said memory, said index class information including index program logic which organizes at least said objects according to at least one criterion, accesses the objects associated therewith when activated, and performs actions on said objects when appropriate based on the properties and types of objects associated with said index; and rule index subclass information stored in said memory, said rule index subclass information including rule index program logic which evaluates at least one rule associated therewith.

* * * * *